United States Patent [19]
Ito et al.

[11] Patent Number: 4,790,590
[45] Date of Patent: Dec. 13, 1988

[54] CORNER BRACKET OF SIDE DOOR FOR AUTOMOBILE

[75] Inventors: Akira Ito, Aichi; Hideo Hagiwara, Ichinomiya; Tetsuo Kaisaku, Komaki, all of Japan

[73] Assignee: Toyoda Gosei Co., Ltd., Nishikasugai, Japan

[21] Appl. No.: 939,882

[22] Filed: Dec. 9, 1986

[30] Foreign Application Priority Data

Dec. 9, 1985 [JP] Japan .............................. 60-189279[U]
Dec. 29, 1985 [JP] Japan ................................ 60-298934
Mar. 28, 1986 [JP] Japan ............................ 61-046375[U]
Jul. 15, 1986 [JP] Japan ................................ 61-166274

[51] Int. Cl.$^4$ .............................................. B60R 1/06
[52] U.S. Cl. ...................................... 296/146; 264/161
[58] Field of Search ........................ 296/146; 350/632; 248/475.1, 466; 264/279.1, 271.1, 161; 425/806

[56] References Cited

U.S. PATENT DOCUMENTS 4,253,633 3/1981 Takegawa ........................ 248/475.1
4,424,182 1/1984 Cerny ................................ 264/161 X
4,660,944 4/1987 Suzuki et al. .................... 350/632 X

FOREIGN PATENT DOCUMENTS 60-12735 4/1985 Japan .
0124548 7/1985 Japan ................................ 350/632
60-234046 11/1985 Japan .
60-234047 11/1985 Japan .

Primary Examiner—Robert B. Reeves
Assistant Examiner—Russell D. Stormer
Attorney, Agent, or Firm—Cushman, Darby & Cushman

[57] ABSTRACT

A corner bracket of a side mirror for an automobile comprises an attaching member for accessory attaching, with a nearly triangular form, having an outer size sufficient to close an angle part formed between a door belt line and a slant pillar disposed on the upper side of the door belt line, and an attaching foot member extending from the attaching member to be fixed to the door body. The attaching member comprises an insert of U-like cross-section coated with high molecular weight elastic material, a glass-enclosing groove, and an attaching hole crossing the glass-enclosing groove. A cylindrical flash formed surrounding the attaching hole is molded having a weakened portion expected to be broken at one end and the weakened portion is cut during the mold releasing operation, whereby the removing work of the cylindrical flash becomes unnecessary after the mold releasing operation has been conducted. The outer circumferential surface of the engaging boss for attaching a blind plate is made to be a tapered surface, whereby the fear of breakage of the engaging boss during the mold releasing is decreased. Molding productivity can be improved in both cases.

12 Claims, 4 Drawing Sheets

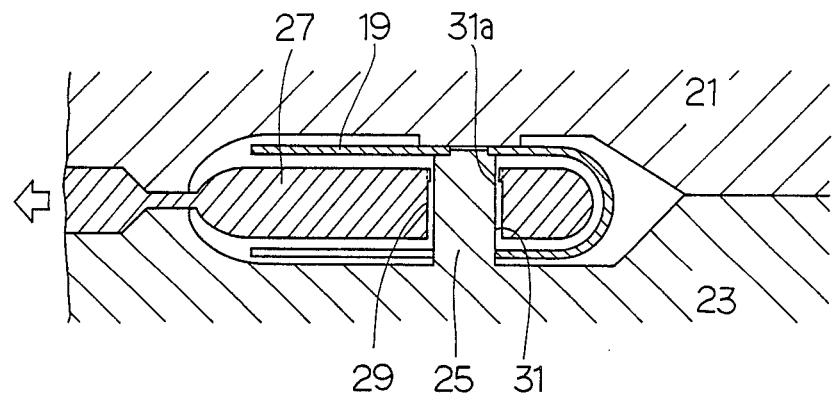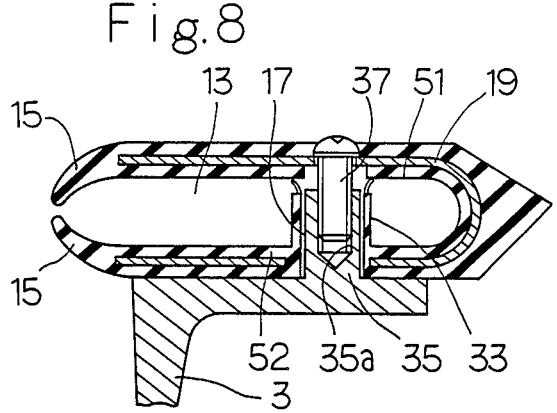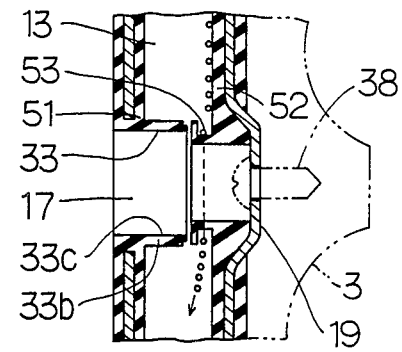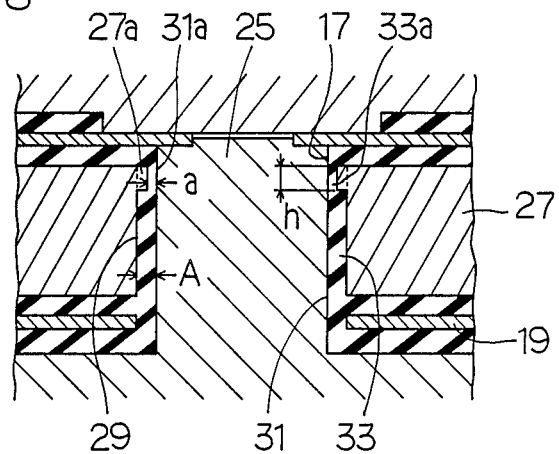

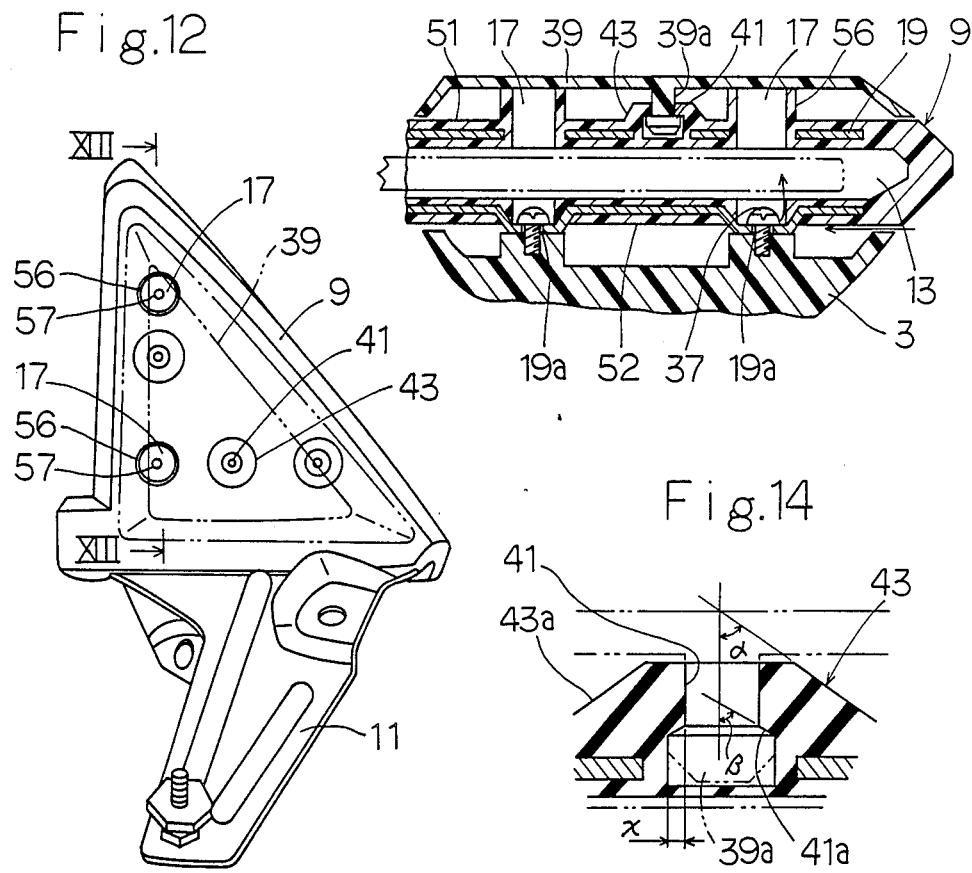

CORNER BRACKET OF SIDE DOOR FOR AUTOMOBILE

BACKGROUND OF THE INVENTION

The present invention relates to a corner bracket of nearly triangular form to be installed mainly at upper end edge corner of a sashless-type automotive side door.

Corner brackets of the above-mentioned type are known from Japanese patent application Nos. 12735/1985, 234046/1985 and 234047/1985. When a door mirror (an accessory to be attached) is attached to a sashless door, for example, a door mirror attaching body is used where the door mirror attaching body comprises a mirror attaching member (attaching member for attaching an accessory to be attached) 9 of nearly triangular form, having an outward size sufficient to fill an angle space formed between a door belt line 5 while the door is closed (referred to herein as the door closed state), and a front pillar (slant pillar) 7 disposed on the upper side of the door belt line 5, and an attaching foot member 11 extending downward from the mirror attaching member 9 and fixed to the sashless door (door body) 1 as shown in FIG. 1.

The mirror attaching member 9 as shown in FIGS. 2 and 3 comprises a glass enclosing groove 13 with cross-section of U-like form having its bottom portion contacting the an edge of the front pillar 7, a door glass run installed on an opening end edge of the glass enclosing groove 13 in opposition to the angle part and composed of a pair of lip strips 15, 15 which converge towards their outer, free ends, and mirror attaching holes 17 (three in number in this example) crossing the glass enclosing groove 13.

The mirror attaching member 9 is molded in a process in which a U-like insert 19 of metal sheet extending integrally from the attaching foot member 11 is coated with a high molecular weight elastic material such as PVC, PVC/NBR polyblend, EPDM or the like by means of transfer, injection molding or the like. More specifically, as shown in FIG. 4, the outside surfaces of the mirror attaching member 9 is formed by a stationary mold 21 and a movable mold 23, and the glass enclosing groove 13 is formed by a core 27 and the mirror attaching hole 17 is formed by a column portion 25 projecting from one of the stationary mold 21 or the movable mold 23, from the movable mold 23 in this example. The column portion 25 is fitted through a hole 29 formed on the core 27. The column portion is preferably formed as a circular column corresponding to the shape of the attaching hole 17, but the column may be square in transverse cross-sectional shape.

During the molding, usually, since a cylindrical gap 31 is formed between the column portion 25 and the through hole 29, a cylindrical flash 33 is produced in the molding product. The cylindrical flash 33 is cut by movement of the core 27 in the white arrow direction during the mold releasing operation. However, since the thickness of the cylindrical flash 33 is nearly constant in the axial direction, the cutting position is not fixed. Consequently, when an attaching boss 34 of the mirror body is inserted from one end of the attaching hole 17 and locked by a screw 37 as shown in FIG. 5, a remaining portion of the flash 33 may become trapped in between the internally screw-threaded fitting 35a of the attaching boss 35 and the screw 37 as shown in FIG. 5 so that performing the task of assembling becomes impossible. Consequently, usually, a step of removing the cylindrical flash is required to be performed after the molding has been completed. Since the cylindrical flash is within the glass enclosing groove, the removing work is troublesome, resulting in an increase in the number of process steps required.

When the above-mentioned door mirror bracket is viewed from the inside of the automobile, the mirror attaching hole 17 and the insert 19 are exposed as shown in FIG. 2. Furthermore, rainwater or wind resistance-generated sound may infiltrate the automobile from outside through the attaching hole 17. Consequently, a blind plate 39 having similar shape to that of the mirror attaching member 9 must be detachably installed as shown in dash—and—dot line of FIG. 2.

In this case, a locking foot can be formed on the rear surface of the blind plate 39 and a locking hole can be formed corresponding to the insert of the mirror attaching member 9 so that the locking foot is engaged with the locking hole and by this means the blind plate 39 is attached to the mirror attaching member 9.

In order to overcome such problems with the prior art construction, the present inventors have devised a modified structure, shown in FIG. 6, in which the locking foot is projected in the glass enclosing groove 13 and therefore does not interfere with the door glass run G and nor cause an interference problem while being molded.

A locking foot 39a with top end swollen is formed on the rear surface of the blind plate 39, and a cylindrical boss 43 having a bottomed locking hole 41 with an enlarged diameter at its base and a locking step 41a formed corresponding to the locking foot 39a is formed on the inside wall (relative to the automobile) 51 of the mirror attaching member 9.

Molding of the mirror attaching member 9 having the cylindrical boss 43 may be performed, in order to suppress use of the slide core to the maximum extent possible, as shown in FIG. 7 where the automobile inside wall-forming surface 45 is provided with a boss outer circumference-forming surface 46, a boss end forming surface 47 and a locking hole-forming column portion 48 in a metal mold similar to that of FIG. 2. In this case, during performance of the step of mold releasing, the outer circumference of the cylindrical boss 43 is restricted and the locking hole-forming column portion 48 is forcedly drawn out of the bottomed locking hole 41 of the cylindrical boss 43, and undercut amount of the locking hole 41, i.e., width X of the locking step 41a is taken large from the viewpoint of locking reliability, whereby the cylindrical boss 43 may be broken and released from the mold resulting in failure of the molding.

SUMMARY OF THE INVENTION

In view of above-mentioned disadvantages in the prior art, an object of the invention is to provide a corner bracket of a side door for an automobile wherein the cylindrical flash surrounding an attaching hole of a substance to be coated need not be removed after the step of mold releasing has been conducted.

Another object of the invention is to provide a corner bracket of a side door for an automobile wherein a cylindrical boss for blind plate attaching is installed, and breakage of the cylindrical boss due to forced pulling scarcely occurs during practice of the mold releasing step.

In a corner bracket of a side door for an automobile according to the invention, a portion which one would expect to break is provided so that a cylindrical flash surrounding an attaching hole for accessory attaching can be cut securely at a prescribed position during the mold releasing whereby the first object is attained, and the outer circumferential surface of the cylindrical boss for blind plate attaching is made with a tapered surface whereby the second object is attained.

BRIEF DESCRIPTION OF THE DRAWINGS

FIG. 8 is a secional view of a door mirror bracket illustrating the mirror attaching state of an embodiment of the invention;

FIG. 9 is a sectional view of an example of a metal mold for molding the door mirror bracket in FIG. 8;

FIG. 10 is an enlarged sectional view of the main part of the metal mold in FIG. 9 after material injection;

FIG. 11 is sectional view of a door mirror bracket illustrating the attaching hole portion of a modification of the embodiment of FIG. 8;

FIG. 12 is a front view of a door mirror bracket viewing from inside of an automobile in a third embodiment of the invention;

FIG. 13 is a sectional view illustrating door mirror attaching state taken along line XIII—XIII of FIG. 12;

FIG. 14 is an enlarged sectional view of a boss for accomplishing blind plate attaching state illustrated in FIG. 13; and FIG. 15 is a sectional view of the main part of a metal mold illustrating the action during the mold releasing step after the boss for accomplishing blind plate attaching in FIG. 14 is molded.

DESCRIPTION OF THE PREFERRED EMBODIMENTS

Figure 1:
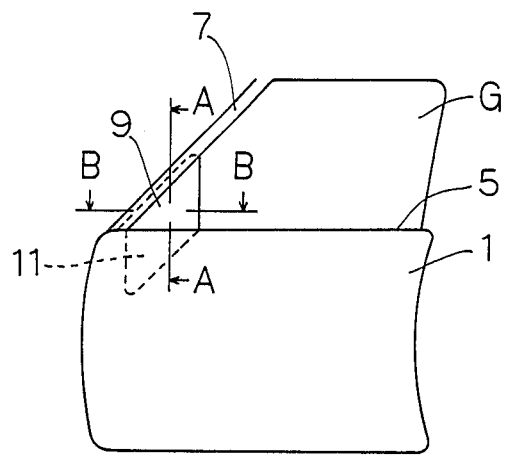
FIG. 1 is a side view of a door body with a door mirror bracket installed thereon.
Figure 2:
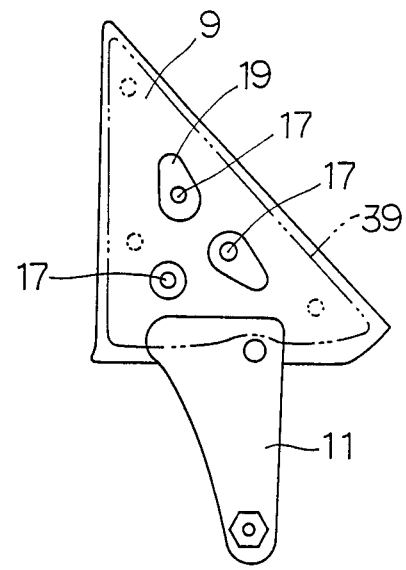
FIG. 2 is a front view of a door mirror bracket viewed from the inside of an automobile.
Figure 3:
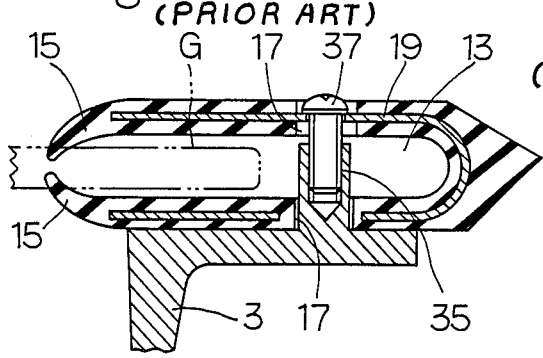
FIG. 3 is a sectional view of a door mirror bracket illustrating the prior art mirror attaching state.
Figure 5:
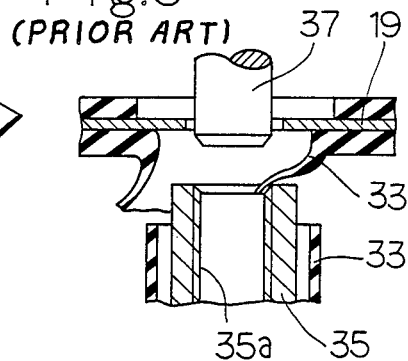
FIG. 5 is a sectional view illustrating a malfunction produced when the metal mold in FIG. 4 is used and the flash surrounding an attaching hole is not removed.
Figure 4:
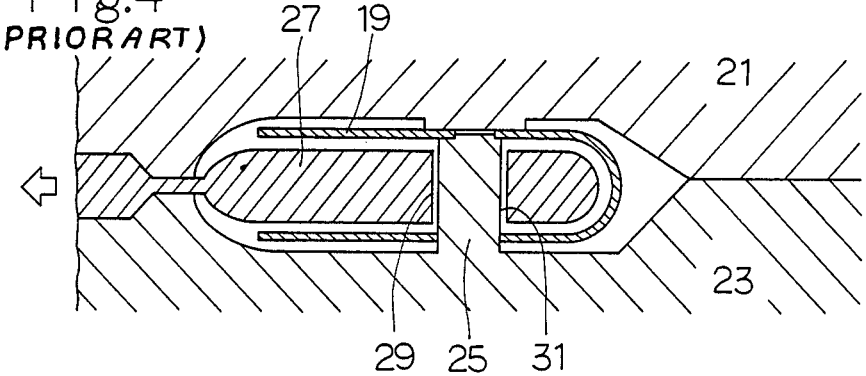
FIG. 4 is a side view of an example of a metal mold for molding a door mirror bracket in the prior art.
Figure 6:
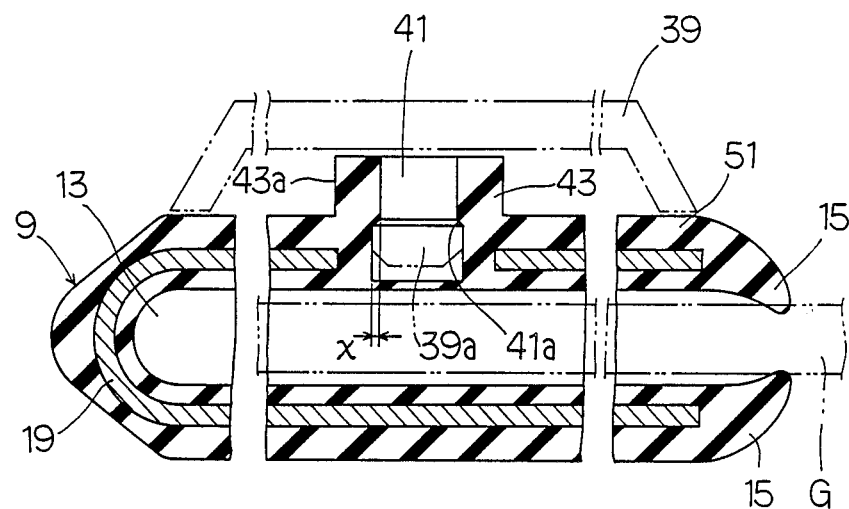
FIG. 6 is a schematic sectional view of a door mirror bracket haing a cylindrical boss with a blind plate to be attached thereto.

Embodiments of the invention will now be described referring to the accompanying drawings. Like parts to that of the above-mentioned example are designated by the same reference numerals and the description shall be partially omitted. In addition, a door mirror is taken as an example of an accessory to be attached, but the invention is not limited to this.

FIG. 8 shows an embodiment of the corner bracket of the invention, and this door mirror bracket (corner bracket) is molded using the metal mold as shown in FIGS. 9 and 10.

A cylindrical gap 31 is formed by a column portion 25 projected from one of a stationary mold 21 or a movable mold 23, from the movable mold 23 in the embodiment, and a through hole 29 of a core 27 to which the column portion 25 is fitted. Injection molding is performed from one end of the cylindrical gap 31, at the inserting side of the mirror attaching boss 35 or at the reverse side. In this embodiment, the injection molding is performed using the upper end as a fine gap 31a. The formation mode of the fine gap depends on an annular band 27a formed at the upper end inner circumferential wall of the through hole 29 of the core 27 in the embodiment, but continuous warty projections may be arranged in place of the annular projection 27a. Reversely, the annular band or the continuous warty projections may be formed on the upper circumferential wall of the column portion 25. In addition, when the usual gap A of the cylindrical gap 31 is 0.3 mm, if the distance a of the fine gap 31a is made a=0.15~0.1 mm, height h=0.5~1.5 mm, malfunction of column portion 25 getting in the through hole 29 of the core 27 is not produced during the mold closing.

When the door mirror bracket is molded using the above-mentioned metal mold, a weak portion (portion expected to be broken) 33a being thin is formed at prescribed position of the cylindrical flash 33, at one end opposite to the inserting side of the mirror attaching boss in the embodiment. Consequently, during the mold releasing (during moving of the core 27), the cylindrical flash 33 is securely cut at one end opposite to inserting side of the attaching boss 35 and is thereby given the shape shown in FIG. 8. Consequently, when the mirror body 3 is attached, there is no fear of the cylindrical flash 33 of getting in the way of the attaching pair member such as screw, more specifically between the attaching boss 35 and the screw 37, and obstructing the assembling. Accordingly, troublesome work of removing the cylindrical flash after the molding becomes unnecessary in the embodiment although it is necessary in the prior art.

FIG. 11 shows a modification of the embodiment of FIG. 8, and the invention is applied to a door mirror bracket of such type that the mirror attaching hole 17 is made a screw driver inserting hole (operating hole for a tool of a fixing device). The cylindrical flash 33 coupled with an automobile inside wall 51 is made smaller diameter at the automobile outside end and a trough 53 is formed. The trough 53 is separated from a usual part 33b connected to the automobile inside wall 51 of the cylindrical flash 33 and connected to the automobile outside wall 52. The trough 53 is 3~5 mm in depth and width. In order to secure separation of the trough 53 from the usual part 33b, as shown in FIG. 1, the cylindrical flash 33 is molded at the top end of the usual part 33b so as to constitute the weakened portion (i.e. portion likely to be broken) being thin.

When the door mirror bracket having the trough 53 at the side of the automobile outside wall 51 of the mirror attaching hole 17 is assembled to an actual automobile, if rainwater enters between the automobile outside lip strip 15 and surface of the glass G, the rainwater passes through the automobile outside wall 52 is flows down, but on account of existence of the trough 53 connected to the automobile outside wall 52 the rainwater does not fall on the inner circumferential wall 33C of the cylindrical flash 33 but is guided by the trough 53 and then falls into the door panel as shown in FIG. 11.

Although the trough 53 is formed throughout the whole circumference in each embodiment, if it is formed at least on the upper half, it can guide the rainwater to fall into the door panel.

FIGS. 12-15 show a third embodiment of the invention. A cylindrical boss 43 having a bottomed locking hole 41 so as to attach a blind plate 39 is provided with an outer circumferential surface 43a formed in taper surface, and a cylindrical seal lip 56 projecting along the periphery of the mirror attaching hole 17 of the mirror attaching member 9 towards inside of the automobile is molded integrally.

The boss has an outer circumferential surface 43a formed so as to be a taper surface extending from a top end portion to a base portion, and the bottomed locking hole 41 of bottom expanding diameter having a locking step 41a to lock a locking foot 39a of the blind plate 39 is formed.

The locking step 41a of the locking hole 41 is formed nearly in parallel to the boss outer circumferential surface 43a.

In the cylindrical boss 43 of the embodiment, the undercut amount X of the locking step 41a is made 1.5 mm, the slant angle $\alpha$ of the outer circumferential surface 43a with respect to the axial direction of the boss 43 is made 55°, and the slant angle $\beta$ of the locking step 41 with respect to the axial direction of the boss 43 is made 60°.

Figure 7:
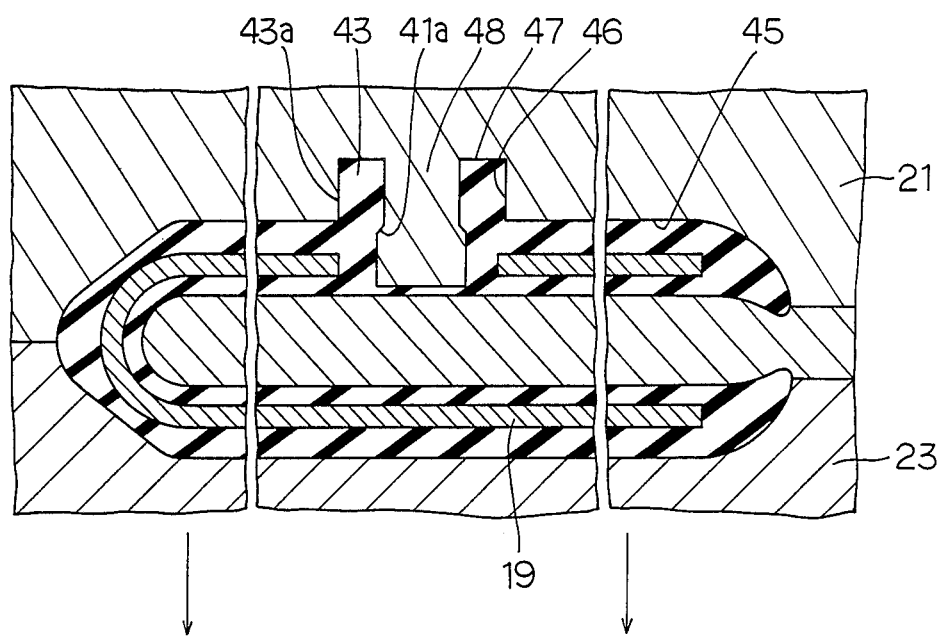
FIG. 7 is a sectional view of an example of a metal mold for molding the door mirror bracket in FIG. 6.

The molding method is similar to that described referring to FIG. 7, and the mold releasing from the automobile inside wall forming surface 45 is performed after finishing the molding, as shown in FIG. 15, a locking hole forming surface 47 is forcedly pulled from the locking hole 41 along the axial direction of the cylindrical boss 43.

In the boss outer circumference forming surface 46 of the stationary mold 21, however, slant of prescribed angle ($\alpha$) with respect to the boss axial direction is formed corresponding to the boss outer circumferential surface 43a, and during the mold releasing prescribed gap "h" is produced to the boss outer circumference forming surface 46 in outside portion of the boss outer circumferential surface 43a corrsponding to distance of the locking hole forming column portion 48 pulled from the locking hole 41, thereby the boss outer circumferential surface 43a is movable outward in the radial direction of the boss 43 and the locking hole 41 is expandable in diameter. At position of the locking hole-forming column portion 48 forming the locking step 41a of the locking hole, slant of prescribed angle ($\beta$) with respect to the boss axial direction is formed corresponding to the locking step 41a nearly in parallel to the boss outer circumferential surface 43a, and also the locking hole-forming column portion 48 can easily slide on the locking step 41a and the locking hole 41 is expandable in diameter, thereby the column projection 45 can be easily separated from the locking hole 41.

Consequently, in the boss 43 of the third embodiment, even if undercut amount x of the locking step 41a is made large, the mold releasing is performed without breaking the boss top end on the upper side of the locking step 41a resulting in an improvement of the molding productivity.

The slant angle $\alpha$ of the outer circumferential surface 43a is made 55° in the boss 43 of the embodiment. If the slant angle $\alpha$ is made too small, the gap h between the outer circumferential-surface 43a and the boss outer circumference forming surface 46 during the mold releasing becomes too small, whereby expansion of the locking hole 41 is suppressed and the mold releasing is obstructed. On the contrary, if the slant angle $\alpha$ is made too large, the distance from the inlet port of the locking hole 41 to the locking step 41a becomes too long, whereby excessive material is required, and although breakage during the mold releasing is prevented, a large strength is required during inserting the locking foot 39a. Accordingly, a slant angle $\alpha$ of about 50°~80° is preferable.

In the cylindrical boss 43 of the embodiment, slant angle $\beta$ to the locking step 41a is made 60° and the locking step 41a is nearly in parallel to the boss outer circumferential surface 43a. If the slant angle $\beta$ is made too small, the locking force to the locking foot 39a is decreased As long as cracking is not produced at lower end portion of the locking step 41a and the locking step 41a is not shaved during the mold releasing and the locking hole forming column portion 48 can be slided on the locking step 41a, the slant angle $\beta$ may be made nearly 90°. Accordingly, a slant angle $\beta$ of about 55°~85° is preferable. As far the relation between the slant angle $\beta$ and the slant angle $\alpha$, the slant angle $\beta$ is preferably set nearly equal to the slant angle $\alpha$ or within range larger than the slant angle $\alpha$ by about 10°.

The cylindrical seal lip 56 is molded simultaneously to molding of the mirror attaching portion 9 by coating the U-like insert 19 with high molecular weight elastic material. Since the locking foot 39a of the blind plate 39 is forcedly fitted to the locking hole 41 of the cylindrical boss 43 formed at the automobile inner wall side of the mirror attaching member, when the blind plate 39 is attached to the automobile inside surface of the mirror attaching member 9, top end portion of the cylindrical seal lip 56 is bent and abuts on the rear surface of the blind plate 39, whereby the screwdriver inserting hole (mirror attaching hole) 17 is sealed. Consequently, as shown by the arrow-marked path in FIG. 13, rainwater or wind resistance noise entering through the screw hole 19a into the glass enclosing groove 13 is interrupted by the cylindrical seal lips 56. The inner diameter of the cylindrical seal lip 56 need not be equal to that of the mirror attaching hole (driver inserting hole) 17 as shown in the embodiment, but may be slightly large. The thickness of the cylindrical seal lip is different depending on material but is made 0.5~1.5 mm when PVC/NBR polyblend is used. In order to improve the adaptability to rear surface of the blind plate 39, i.e., seal property, the cylindrical seal lip 56 may be made thinner towards top end side. The cylindrical seal lip 39 is not limited to circular form but may be of polygonal form.

Although a tapping screw is exemplified as the fixing device in the above description, a bolt-nut assembly or clip may be used.

What is claimed is:

1. A corner bracket for an automobile side door of a door type which has an inside and an outside and a sector of spaced defined between a generally horizontal door belt line and a pillar which slants upwards from a juncture with the door belt line, whereby the sector of space has an included angle between the door belt line and the slanting pillar, said corner bracket comprising:

an accessory-attaching member having a main portion of generally triangular form, for fully occupying said sector of space, from said juncture out to a given lateral distance from said juncture;

an attaching foot member extending laterally from said main portion of said accessory-attaching member and being provided with securement means for fixing said accessory-attaching member to an automobile side door;

said accessory-attaching member main portion comprising an insert having a U-shaped cross-sectional shape, said insert having a coating of high molecular weight elastic material, said main portion thereby including an inner side wall and an outer side wall, relative to an automobile, defining between them a groove, open at one end, for receiving a door glass;

means defining at least one pair of aligned openings transversally through said main portion, including one opening through said inner side wall of said insert and one opening through said outer side wall of said insert;

said coating of high molecular weight elastic material including an integral tubular flash based on one of said side walls within said groove and disposed so as to surround an axis passing between said aligned openings, thereby providing an axially extending inner peripheral wall; said integral tubular flash terminating short of the other of said side walls in a free end, and having a free end portion located axially adjacent said free end, said free end portion being constituted by an axially short annular band in which said high molecular weight elastic material is abruptly thinner than within a main portion constituting a remainder of said integral tubular flash, said tubular flash remaining substantially unobstructed radially internally of said main portion thereof by said annular band.

2. The corner bracket of claim 1, wherein:
said one side wall is said outer side wall; and
said main portion of said tubular flash is arranged to telescopically receive an attaching boss of an accessory.

3. The corner bracket of claim 2, wherein:
said insert, on said inner side wall of said main portion of said accessory-attaching member, is provided with engagement surface means peripherally of the respective said one opening for receiving an enlarged head of a fastener, whereby an accessory may be attached to an automobile by attaching said attaching foot member to an automobile side door using said securement means, telescopically inserting an attaching boss of an accessory into said main portion of said tubular flash through the respective said one opening in said outer side wall of said main portion of said accessory-attaching member, and installing an enlarged-head fastener through the respective said on opening of said inner side wall of said main portion of said accessory-attaching member into the attaching boss of the accessory, until the enlarged head of the fastener is urged tightly against said inner side wall of said main portion of said accessory-attaching member.

4. The corner bracket of claim 1, further including:
an axially short tubular member integrally formed on said other of said side walls within said groove in axial alignment with said tubular flash; said axially short tubular member terminating axially short of said free end of said tubular flash in a radially outwardly-directed flange which defines between said flange, said axially short tubular member and said other of said side walls an axially outwardly-opening trough.

5. The corner bracket of claim 4, wherein:
said corner bracket is oriented so that said axis extends generally horizontally;
said radially outwardly-directed flange extends throughout at least 180 degrees about said axis; and
said trough opens generally upwardly within a respective portion thereof.

6. The corner bracket of claim 4, wherein:
said insert, on said outer side wall of said main portion of said accessory-attaching member, is provided with engagement surface means peripherally of the respective said one opening for receiving an enlarged head of a fastener, whereby an accessory may be attached to an automobile by attaching said attaching foot member to an automobile side door using said securement means, applying an accessory against an outer side of said outer side wall of said main portion of said accessory-attaching member and installing an enlarged head fastener through the respective said one opening in said inner side wall, though said tubular flash, and through the respective said one opening in said outer side wall and into the accessory, until the enlarged head of the fastener is urged tightly against said engagement surface means on an inner side of said outer side wall of said main portion of said accessory-attaching member.

7. The corner bracket of claim 6, wherein:
said corner bracket is oriented so that said axis extends generally horizontally;
said radially outwardly-directed flange extends throughout at least 180 degrees about said axis; and
said trough opens generally upwardly within a respective portion thereof.

8. A corner bracket for an automobile side door of a door type which has an inside and an outside and a sector of space defined between a generally horizontal door belt line and a pillar which slants upwards from a juncture with the door belt line, whereby the sector of space has an included angle between the door belt line and the slanting pillar,
said corner bracket comprising:
an accessory-attaching member having a main portion of generally triangular form, for fully occupying said sector of space, from said juncture out to a given lateral distance from said juncture;
an attaching foot member extending laterally from said main portion of said accessory-attaching member and being provided with securement means for fixing said accessory-attaching member to an automobile side door;
said accessory-attaching member main portion comprising an insert having a U-shaped cross-sectional shape, said insert having a coating of high molecular weight elastic material, said main portion thereby including an inner side wall and an outer side wall, relative to an automobile, defining between them a groove, open at one end, for receiving a door glass;
means defining at least one pair of aligned openings transversally through said main portion, including one opening through said inner side wall of said insert and one opening through said outer side wall of said insert;
said coating of high molecular weight elastic material including an integral tubular sealing lip based on an inner side of said inner side wall around a respective said one opening and disposed so as to surround an axis passing between said aligned openings, said sealing lip terminating in a free end;

a blind plate positioned in covering relation to at least a portion of said inner side wall of said main portion of said accessory-attaching member so as to cover the respective said one opening in said inner side wall and sealingly engage said free end of said sealing lip; and means attaching said blind plate to said inner side wall of said main portion of said accessory-attaching member.

9. The corner bracket of claim 8, wherein:

said attaching means comprises an enlarged-head locking foot integrally molded on a rear face of said blind plate, and an internally-enlarged, inwardly-opening blind socket formed in an inner side of said inner side wall of said main portion of said accessory-attaching member, said locking foot having an enlarged head thereof snap-fitted into an internally-enlarged cavity of said blind socket.

10. The corner bracket of claim 9, wherein:

said blind socket is integrally formed in a boss integrally molded with said coating of said high molecular weight elastic material on an inner side of said inner side wall.

11. The corner bracket of claim 10, wherein:

said boss is defined by an external surface which tapers at a first angle towards an entrance end of an opening to said blind socket, and wherein said enlarged cavity is defined in part by an annular internal locking step surface which tapers at a second angle towards an opposite end of said opening to said blind socket; said first angle being an acute angle relative to said axis, and said second angle being a larger acute angle than said first angle relative to said axis, but within ten degrees of the size of said first angle.

12. The corner bracket of claim 11, wherein:

said first angle lies in the range 50°–80° and said second angle lies in the range 55°–85°.

* * * * *